(12) United States Patent
Suzuki et al.

(10) Patent No.: US 8,031,939 B2
(45) Date of Patent: Oct. 4, 2011

(54) COLOR PROCESSING METHOD AND APPARATUS

(75) Inventors: Takahiro Suzuki, Tokyo (JP); Hisato Sekine, Yokohama (JP); Yukinobu Akado, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 12/106,152

(22) Filed: Apr. 18, 2008

(65) Prior Publication Data

US 2008/0260246 A1  Oct. 23, 2008

(30) Foreign Application Priority Data

Apr. 23, 2007  (JP) .................. 2007-113029

(51) Int. Cl.
  *G06K 9/00* (2006.01)
(52) U.S. Cl. ............ 382/167; 382/162; 382/274
(58) Field of Classification Search .......... 382/162, 382/167, 274; 345/589, 207; 348/371, E9.052; 347/19

See application file for complete search history.

(56) References Cited

U.S. PATENT DOCUMENTS

| | | |
|---|---|---|
| 5,546,195 A | 8/1996 | Arai |
| 5,956,015 A | 9/1999 | Hino |
| 6,542,634 B1 | 4/2003 | Ohga |
| 2003/0016862 A1 | 1/2003 | Ohga |
| 2005/0111017 A1 | 5/2005 | Takahashi et al. |

FOREIGN PATENT DOCUMENTS

JP  10-032724 A  2/1998

OTHER PUBLICATIONS

Herron S, "Memory-color test forms in real-world applications" Proceedings of the Spie—The International Society for Optical Engineering Spie—Int, Soc. Opt. Eng USA, vol. 5294, No. 1, 2003, pp. 176-180, XP002551700. ISSN: 0277-786X.

Emmett Ientilucci, Measurement of the Spectral Distribution of Gas Discharge, Flourescent and Incadescent Sources, Jun. 26, 2000, pp. 1-10, XP002551570.

*Primary Examiner* — Anh Hong Do (74) *Attorney, Agent, or Firm* — Canon U.S.A. Inc., I.P. Division (57) ABSTRACT

A color processing method includes outputting, via an image output device, a chart image in which a plurality of images obtained by applying illuminant corrections corresponding to a plurality of different illuminants to images corresponding to a plurality of representative colors are arranged in a predetermined layout, receiving a user's instruction to select one of the illuminant corrections corresponding to one of the plurality of different illuminants based on the output chart image, and setting the selected illuminant correction to be applied to an original image, wherein the plurality of representative colors are memory colors.

9 Claims, 10 Drawing Sheets

| 1 | 2 | 3 | 4 | 5 | 6 |
|---|---|---|---|---|---|
| FLESH-COLORED IMAGE 1 | FLESH-COLORED IMAGE 2 | FLESH-COLORED IMAGE 3 | FLESH-COLORED IMAGE 4 | FLESH-COLORED IMAGE 5 | FLESH-COLORED IMAGE 6 |
| RED IMAGE 1 | RED IMAGE 2 | RED IMAGE 3 | RED IMAGE 4 | RED IMAGE 5 | RED IMAGE 6 |
| GREEN IMAGE 1 | GREEN IMAGE 2 | GREEN IMAGE 3 | GREEN IMAGE 4 | GREEN IMAGE 5 | GREEN IMAGE 6 |
| BLUE IMAGE 1 | BLUE IMAGE 2 | BLUE IMAGE 3 | BLUE IMAGE 4 | BLUE IMAGE 5 | BLUE IMAGE 6 |

FIG. 5

| NUMBER | ILLUMINANT CORRECTION PARAMETERS ||
|---|---|---|
| | ILLUMINANT TYPE | COLOR TEMPERATURE |
| 1 | BROAD-BAND TYPE | 3000K |
| 2 | BROAD-BAND TYPE | 5000K |
| 3 | THREE-BAND TYPE | 3000K |
| 4 | THREE-BAND TYPE | 5000K |
| 5 | NORMAL TYPE | 3000K |
| 6 | NORMAL TYPE | 5000K |

| BROAD-BAND TYPE 3000K | | | | | | NORMAL TYPE 3000K | | | | | | THREE-BAND TYPE 3000K | | | | | |
|---|---|---|---|---|---|---|---|---|---|---|---|---|---|---|---|---|---|
| R | G | B | J | a | b | R | G | B | J | a | b | R | G | B | J | a | b |
| 0 | 0 | 0 | **** | **** | **** | 0 | 0 | 0 | **** | **** | **** | 0 | 0 | 0 | **** | **** | **** |
| 0 | 0 | 32 | **** | **** | **** | 0 | 0 | 32 | **** | **** | **** | 0 | 0 | 32 | **** | **** | **** |
| 0 | 0 | 64 | **** | **** | **** | 0 | 0 | 64 | **** | **** | **** | 0 | 0 | 64 | **** | **** | **** |
| ÷ | + | + | **** | **** | **** | + | + | + | **** | **** | **** | + | + | + | **** | **** | **** |
| ÷ | + | + | **** | **** | **** | + | + | + | **** | **** | **** | + | + | + | **** | **** | **** |
| ÷ | + | + | + | + | + | + | + | + | + | + | + | + | + | + | + | + | + |
| 64 | 128 | 160 | + | + | + | 64 | 128 | 160 | + | + | + | 64 | 128 | 160 | + | + | + |
| 64 | 128 | 192 | + | + | + | 64 | 128 | 192 | + | + | + | 64 | 128 | 192 | + | + | + |
| 64 | 128 | 224 | + | + | + | 64 | 128 | 224 | + | + | + | 64 | 128 | 224 | + | + | + |
| + | + | + | + | + | + | + | + | + | + | + | + | + | + | + | + | + | + |
| + | + | + | + | + | + | + | + | + | + | + | + | + | + | + | + | + | + |
| + | + | + | + | + | + | + | + | + | + | + | + | + | + | + | + | + | + |
| 255 | 255 | 224 | + | + | + | 255 | 255 | 224 | + | + | + | 255 | 255 | 224 | + | + | + |
| 255 | 255 | 255 | **** | **** | **** | 255 | 255 | 255 | **** | **** | **** | 255 | 255 | 255 | **** | **** | **** |

| BROAD-BAND TYPE 5000K | | | | | | NORMAL TYPE 5000K | | | | | | THREE-BAND TYPE 5000K | | | | | |
|---|---|---|---|---|---|---|---|---|---|---|---|---|---|---|---|---|---|
| R | G | B | J | a | b | R | G | B | J | a | b | R | G | B | J | a | b |
| 0 | 0 | 0 | **** | **** | **** | 0 | 0 | 0 | **** | **** | **** | 0 | 0 | 0 | **** | **** | **** |
| 0 | 0 | 32 | **** | **** | **** | 0 | 0 | 32 | **** | **** | **** | 0 | 0 | 32 | **** | **** | **** |
| 0 | 0 | 64 | **** | **** | **** | 0 | 0 | 64 | **** | **** | **** | 0 | 0 | 64 | **** | **** | **** |
| ÷ | + | + | **** | **** | **** | ÷ | + | + | **** | **** | **** | ÷ | + | + | **** | **** | **** |
| ÷ | + | + | **** | **** | **** | ÷ | + | + | **** | **** | **** | ÷ | + | + | **** | **** | **** |
| ÷ | + | + | + | + | + | ÷ | + | + | + | + | + | ÷ | + | + | + | + | + |
| 64 | 128 | 160 | + | + | + | 64 | 128 | 160 | + | + | + | 64 | 128 | 160 | + | + | + |
| 64 | 128 | 192 | + | + | + | 64 | 128 | 192 | + | + | + | 64 | 128 | 192 | + | + | + |
| 64 | 128 | 224 | + | + | + | 64 | 128 | 224 | + | + | + | 64 | 128 | 224 | + | + | + |
| + | + | + | + | + | + | + | + | + | + | + | + | + | + | + | + | + | + |
| + | + | + | + | + | + | + | + | + | + | + | + | + | + | + | + | + | + |
| + | + | + | + | + | + | + | + | + | + | + | + | + | + | + | + | + | + |
| 255 | 255 | 224 | + | + | + | 255 | 255 | 224 | + | + | + | 255 | 255 | 224 | + | + | + |
| 255 | 255 | 255 | **** | **** | **** | 255 | 255 | 255 | **** | **** | **** | 255 | 255 | 255 | **** | **** | **** |

COLOR PROCESSING METHOD AND APPARATUS

BACKGROUND OF THE INVENTION

1. Field of the Invention

The present invention relates to a method and an apparatus for identifying an illuminant correction suitable for a viewing illuminant used when a user views an output image.

2. Description of the Related Art

Personal computers are widely used and associated with an image input device (digital camera, color scanner, etc.) that can capture an image, a display device (cathode ray tube (CRT), liquid crystal display (LCD), etc.) that displays an image, and an output device (color printer, etc.) that outputs an image. Under such circumstances, a color management technique is required for compensating for differences between color gamuts of different devices and correcting colors according to the purpose. For example, if the color management technique is employed, an image captured by a digital camera is converted into a desirable image, and the converted image is printed by a printer.

However, when a user views an output image, the image is differently viewed if a viewing illuminant is changed. Even if an image of a printed product is acceptable under a specific viewing illuminant, the image may be viewed undesirable under a different viewing illuminant. For example, if an output device is set to produce a printed image so as to be viewed desirable under a pale viewing illuminant (e.g., daylight color fluorescent lamp), the image may be viewed as a red-intensified image under a red viewing illuminant (e.g., incandescent bulb). To solve the above-described problem, an operation for viewing a printed product requires acquiring information of a viewing illuminant beforehand, and performing color management processing suitable for the selected viewing illuminant.

According to a color processing apparatus discussed in U.S. Pat. No. 6,542,634, a user inputs viewing illuminant information to perform color management suitable for a viewing illuminant.

However, if a user inputs viewing illuminant information according to the above-described method discussed in U.S. Pat. No. 6,542,634, the user is required to be knowledgeable about viewing illuminants. If it is necessary to measure a viewing illuminant, a special measurement device for the viewing illuminant is required.

SUMMARY OF THE INVENTION

Exemplary embodiments of the present invention are directed to facilitating simply identifying a viewing illuminant in a user environment and applying an appropriate illuminant correction to the identified viewing illuminant.

According to an aspect of the present invention, a color processing method includes outputting, via an image output device, a chart image in which a plurality of images obtained by applying illuminant corrections corresponding to a plurality of different illuminants to images corresponding to a plurality of representative colors are arranged in a predetermined layout, receiving a user's instruction to select one of the illuminant corrections corresponding to one of the plurality of different illuminants based on the output chart image, and setting the selected illuminant correction to be applied to an original image, wherein the plurality of representative colors are memory colors.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 7 illustrates example color gamut data of an output device stored in an output device color gamut storage unit.

DETAILED DESCRIPTION OF THE EMBODIMENTS

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will now be described in detail with reference to the drawings.

Figure 1:
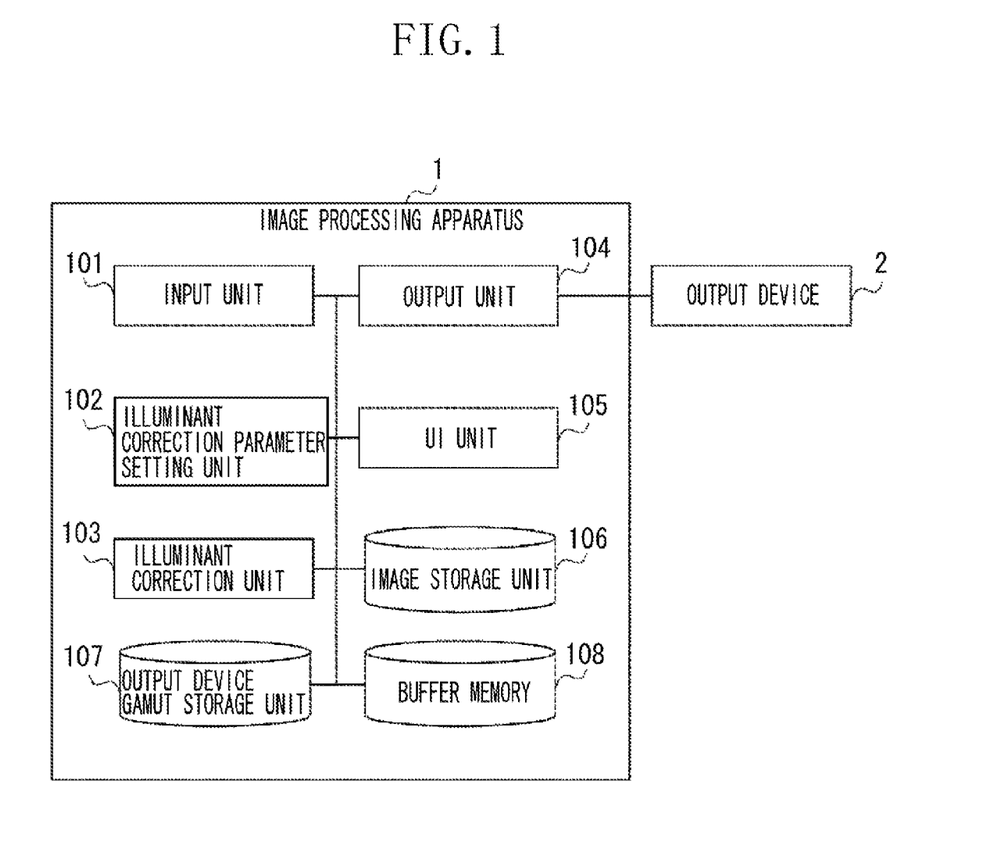
FIG. 1 is a block diagram illustrating a system according to an exemplary embodiment of the present invention.

FIG. 1 is a block diagram illustrating a system according to an exemplary embodiment of the present invention. An image processing apparatus 1 illustrated in FIG. 1 includes an input unit 101 that receives image data. An illuminant correction parameter setting unit 102 sets illuminant correction parameters according to an illuminant correction instruction input by a user. An illuminant correction unit 103 applies an illuminant correction to an input image (original image) based on the set illuminant correction parameters. An output unit 104 outputs image data to an image output device (e.g., a printer).

A user interface (UI) unit 105 enables a user to input an illuminant correction instruction. An image storage unit 106 (e.g., a hard disk or a nonvolatile memory) stores data of a chart image that can be used to estimate a viewing illuminant. An output device gamut storage unit 107 (e.g., a nonvolatile memory) stores color gamut data of the output device 2. A buffer memory 108 (e.g., a random access memory (RAM)) temporarily stores a calculation result of processing in progress. The output device 2 is, for example, a color printer.

The output device 2 is connected to the image processing apparatus 1 via a serial bus interface (e.g., Universal Serial Bus (USB) or Institute of Electrical and Electronics Engineers (IEEE) 1394).

Figure 2:
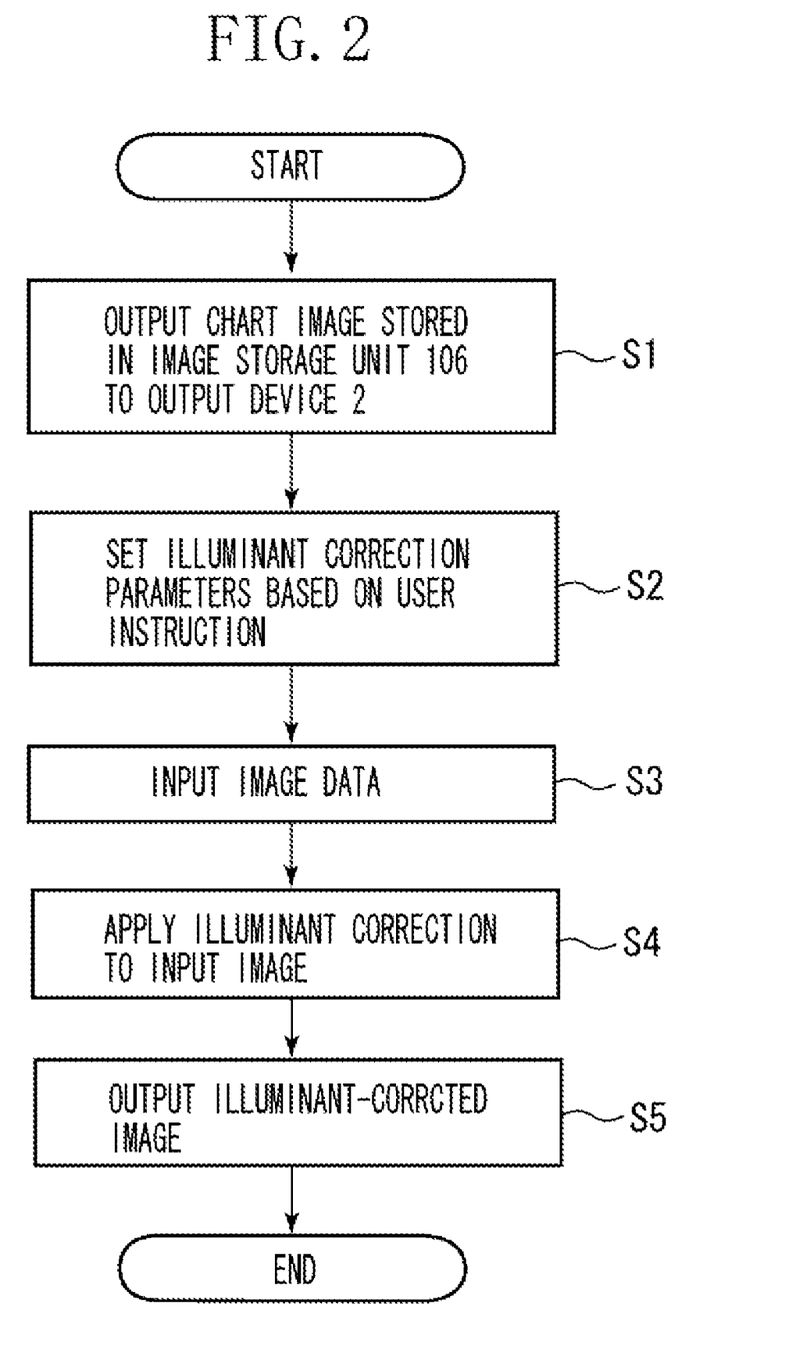
FIG. 2 is a flowchart illustrating example processing performed by an image processing apparatus.

FIG. 2 is a flowchart illustrating example processing performed by the image processing apparatus 1.

Figure 3:
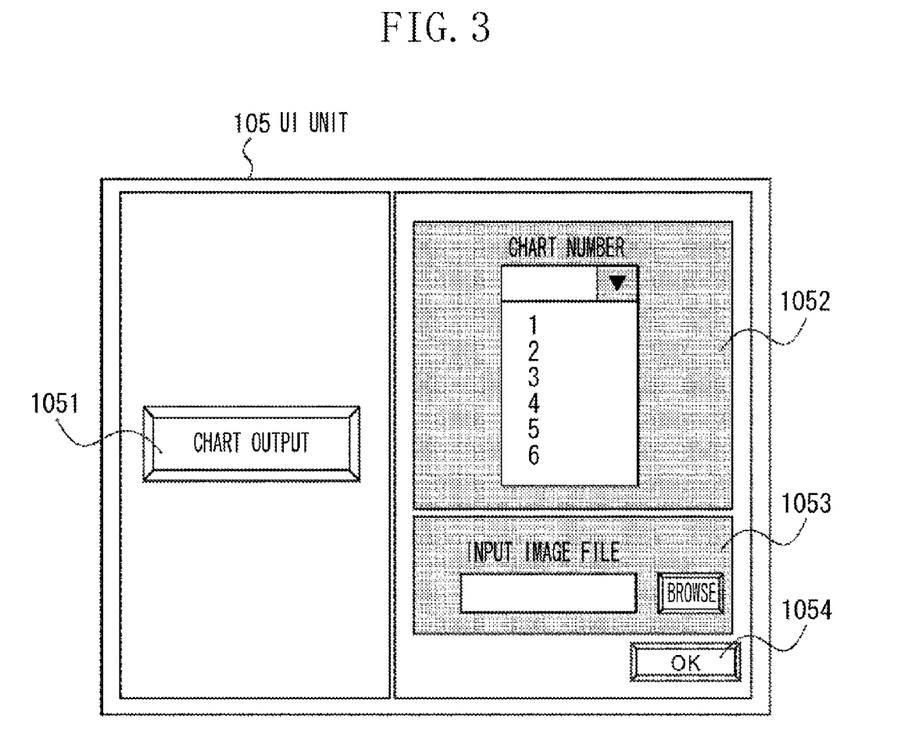
FIG. 3 illustrates an example user interface (UI) unit.
Figure 4:
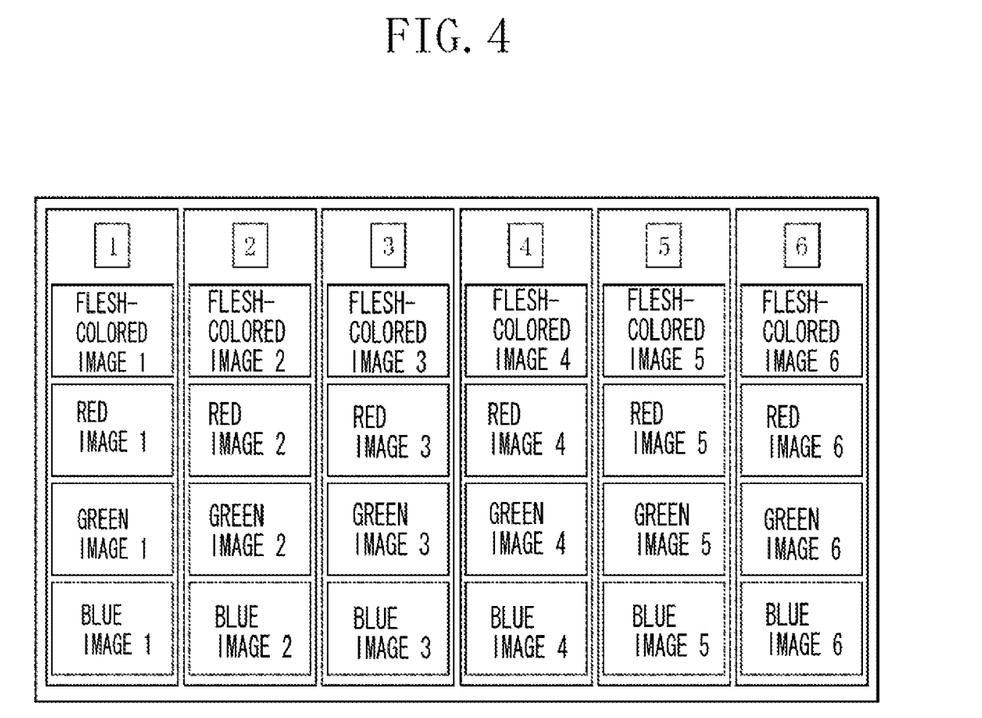
FIG. 4 illustrates an example chart image stored in an image storage unit.

In step S1, the output unit 104 detects a depression of a chart output button 1051 equipped on the UI unit 105 (FIG. 3) by a user. Then, in response to detection of the depression, the output unit 104 outputs the data of the chart image in the image storage unit 106 to the output device 2. FIG. 4 illustrates an example chart image. As illustrated in FIG. 4, the chart image includes a plurality of images obtained by applying illuminant corrections corresponding to a plurality of different illuminants to a basic image and arrayed in a predetermined layout pattern. In the chart image, a unique number is allocated to each illuminant correction (e.g., numbers 1 to 6 according to the example illustrated in FIG. 4). In step S1, the output unit 104 outputs image data of the chart image to the output device 2. The output device 2 prints the chart image. An example method for generating a chart image is described later.

In step S2, the illuminant correction parameter setting unit 102 detects a number input by a user via the UI unit 105 and sets illuminant correction parameters corresponding to the detected number to the illuminant correction unit 103. The user can view a chart image (print product) output from the output device 2 under a viewing illuminant (i.e., an illuminant used by the user to view an output image). Then, the user enters a number allocated to an illuminant-corrected image that is viewed most desirable in the chart image into a chart number entry field 1052 of the UI unit 105. If the user presses an OK button 1054, the illuminant correction parameter setting unit 102 sets illuminant correction parameters (illuminant type and color temperature) corresponding to the number entered in the chart number entry field 1052 to the illuminant correction unit 103, based on the correspondence table illustrated in FIG. 5. The illuminant correction parameters according to an exemplary embodiment include color temperature of a viewing illuminant and type of spectral distribution (e.g., broad-band type, three-band type, and normal type).

In step S3, the input unit 101 acquires an input image file corresponding to an image file name entered in an input image file name entry field 1053 of the UI unit 105 and stores image data of the input image file into the buffer memory 108.

In step S4, the illuminant correction unit 103 applies an illuminant correction to image data of the input image file stored in the buffer memory 108 based on the illuminant correction parameters set in step S2. Example processing performed by the illuminant correction unit 103 is described later.

In step S5, the output unit 104 outputs image data subjected to the illuminant correction in step S4 to the output device 2.

Figure 6:
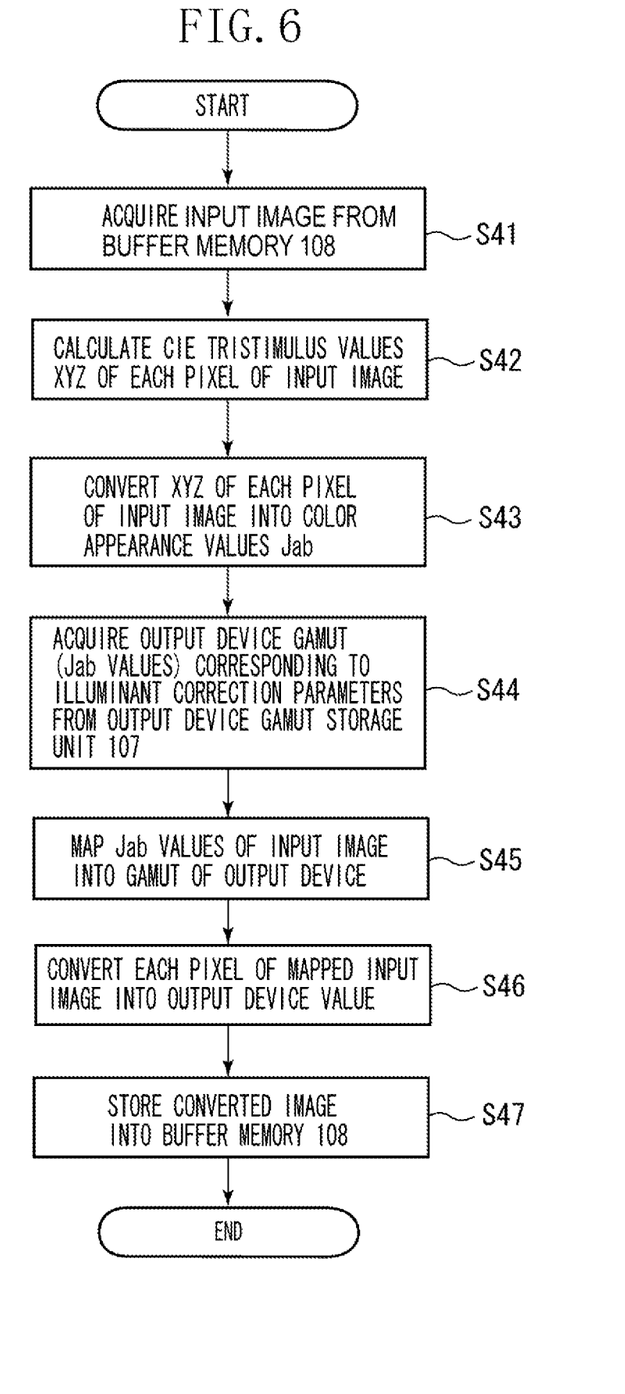
FIG. 6 is a flowchart illustrating example processing performed by an illuminant correction unit.

FIG. 6 is a flowchart illustrating an example of the processing in step S4 performed by the illuminant correction unit 103. In step S41, the illuminant correction unit 103 acquires image data of an input image from the buffer memory 108.

In step S42, the illuminant correction unit 103 calculates CIE tristimulus values XYZ for each pixel of the input image. In an exemplary embodiment, the input image is 8-bit data. The color space expressing an image is an sRGB color space, which is an international standard color space. The following formula (1) defines the transformation of the sRGB color space into XYZ values.

$$\begin{cases} R' = R/255 \\ G' = G/255 \\ B' = B/255 \end{cases} \quad (1)$$

$$\text{If } R', G', \text{ and } B' \le 0.04045 \begin{cases} R'' = R'/12.92 \\ G'' = G'/12.92 \\ B'' = B'/12.92 \end{cases}$$

$$\text{If } R', G', \text{ and } B' > 0.04045 \begin{cases} R'' = \left[\frac{(R' + 0.055)}{1.055}\right]^{2.4} \\ G'' = \left[\frac{(G' + 0.055)}{1.055}\right]^{2.4} \\ B'' = \left[\frac{(B' + 0.055)}{1.055}\right]^{2.4} \end{cases}$$

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R'' \\ G'' \\ B'' \end{pmatrix}$$

The illuminant correction unit 103 converts RGB values of each pixel of the input image into XYZ values according to the transformation formula (1).

In step S43, the illuminant correction unit 103 converts the XYZ values of each pixel of the input image into color appearance values. In an exemplary embodiment, the illuminant correction unit 103 uses a forward conversion model of the CIE-standardized color appearance model CIECAM02 to convert XYZ values of each pixel into color appearance values "Jab". The viewing condition parameters used in the conversion of step S43 comply with the reference viewing condition of sRGB.

In step S44, the illuminant correction unit 103 reads, from the output device gamut storage unit 107, color gamut data corresponding to the set illuminant correction parameters.

FIG. 7 illustrates example color gamut data of the output device 2 stored in the output device gamut storage unit 107. The colors are viewed different by a user if the viewing illuminant is changed. Thus, the output device gamut storage unit 107 stores color gamut data of the output device 2 for each illuminant type as illustrated in FIG. 7. The stored color gamut data are described as Jab values that are calculated from measurements of patches output by the output device 2 based on 9-sliced RGB data (729 colors) in the range of 0≦R, G, B≦255. The output device 2 outputs patches corresponding to the 9-sliced RGB data beforehand. A spectral reflectance of each of the patches is measured with a calorimeter. XYZ values of each patch corresponding to each illuminant are calculated from a spectral reflectance of the patch and a spectral radiance of the illuminant. Then, Jab values of each patch corresponding to each illuminant are calculated from the XYZ values of each patch corresponding to each illuminant according to the color appearance model.

The color gamut data according to an exemplary embodiment is stored corresponding to the type of each illuminant. The color gamut data indicates a relationship between device values (e.g., device RGB values) and measured color values (e.g., Jab values). The color gamut data according to an exemplary embodiment indicates not only the color gamut of an output device but also color reproduction characteristics of the output device.

The output color gamut used for gamut mapping can be calculated by analyzing read color gamut data. An example analyzing method includes reading Jab values corresponding to RGB data in which one of R, G, and B is 0 and generating a geometric solid based on the read Jab values. Another example analyzing method includes generating a convex polyhedron involving Jab values stored in color gamut data.

In step S45, the illuminant correction unit 103 maps the Jab values converted in step S43 into a color gamut of the output device 2 corresponding to the set illuminant correction parameters. According to an exemplary embodiment, the illuminant correction unit 103 maps the Jab values within the output color gamut such that memory colors can be reproduced as desirable colors. There are various methods for mapping memory colors as desirable colors. Memory colors are colors recalled by a user in association with familiar objects, such as the sky, human skin, etc.

In step S46, the illuminant correction unit 103 converts the mapped Jab values into output device values (e.g., device RGB values). More specifically, the illuminant correction unit 103 calculates device RGB values corresponding to the mapped Jab values using a relationship between RGB data of 729 colors stored in the color gamut data and Jab values.

For example, the illuminant correction unit 103 detects a plurality of Jab values surrounding a target Jab value and estimates a device RGB value corresponding to the target Jab value from the device RGB values corresponding to the detected Jab values by performing an appropriate interpolation calculation (e.g., cubic interpolation or tetrahedral interpolation).

In step S47, the illuminant correction unit 103 stores the converted device RGB values into the buffer memory 108 and then terminates the processing.

The illuminant correction unit 103 according to this embodiment acquires color gamut data corresponding to illuminant correction parameters set by the illuminant correction parameter setting unit 102, and calculates device values based on the acquired color gamut data. Accordingly, the image processing apparatus 1 can realize an appropriate color reproduction according to a particular viewing illuminant.

Figure 8:
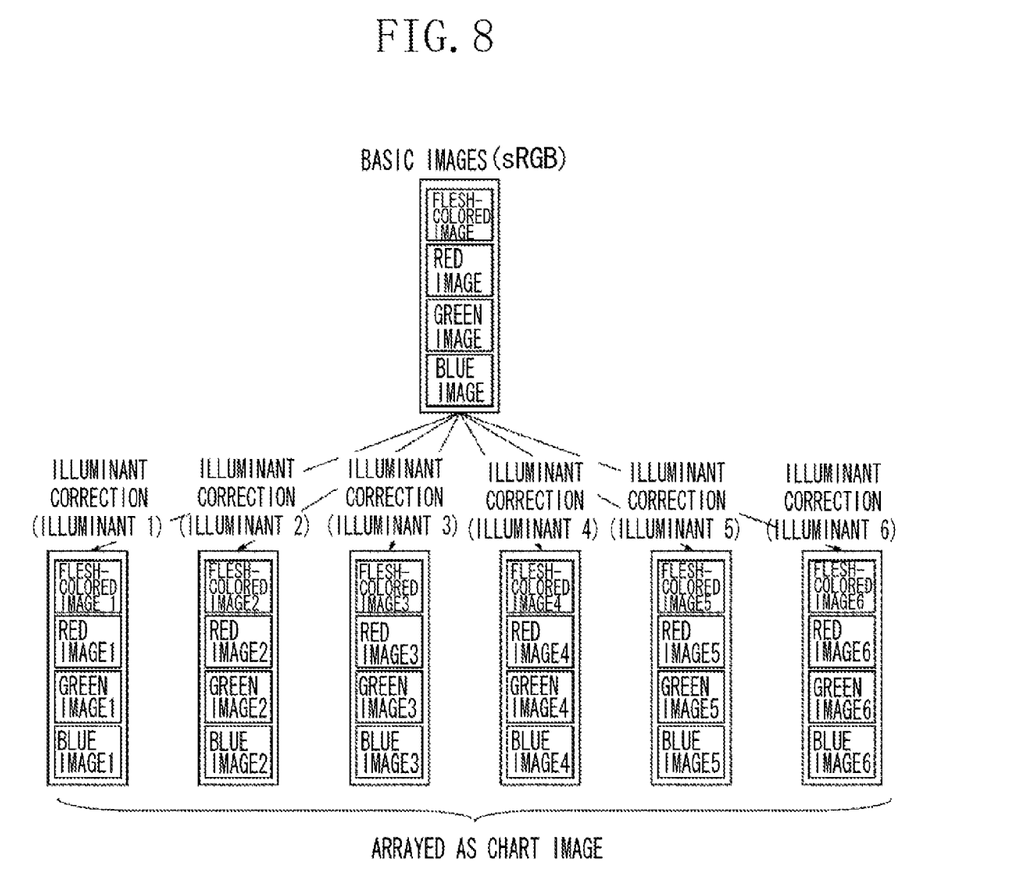
FIG. 8 illustrates an example method for generating a chart image.

The chart image according to an exemplary embodiment (FIG. 4) includes images obtained by applying illuminant corrections corresponding to different illuminants to four natural images of different colors (hereinafter referred to as "basic images") (FIG. 8). The data of the chart image is stored in the image storage unit 106. The data of the chart image describes device values (device RGB values) of the output device 2.

The chart image is output via the output device 2, so that a user can select a desired correction image. Namely, the user can determine an illuminant correction most suitable for a viewing illuminant. Accordingly, it is useful that the chart image includes natural images having essential colors (representative colors), such as a flesh color, which are generally referred to as "memory colors."

Using natural images having memory colors enables a user to easily determine the suitable one compared to the usage of the color patches. Namely, without having any expert knowledge about colors, a user can accurately identify an illuminant correction most suitable for a viewing illuminant.

Furthermore, it is useful to combine a plurality of memory colors because the amount of change of an appearance corresponding to an illuminant differs with each color. Therefore, an exemplary embodiment selects one color from each region of red, green, blue, and flesh color illustrated in FIG. 9 and generates four basic images corresponding to the selected four colors. Then, an exemplary embodiment generates images by applying illuminant corrections corresponding to viewing illuminants to the basic images including four images. The chart image is generated by combining images corresponding to a plurality of viewing illuminants. The chart image illustrated in FIG. 4 includes 24 images, which are generated from four basic images corresponding to each of six viewing illuminants, and arranged side by side.

Figure 9:
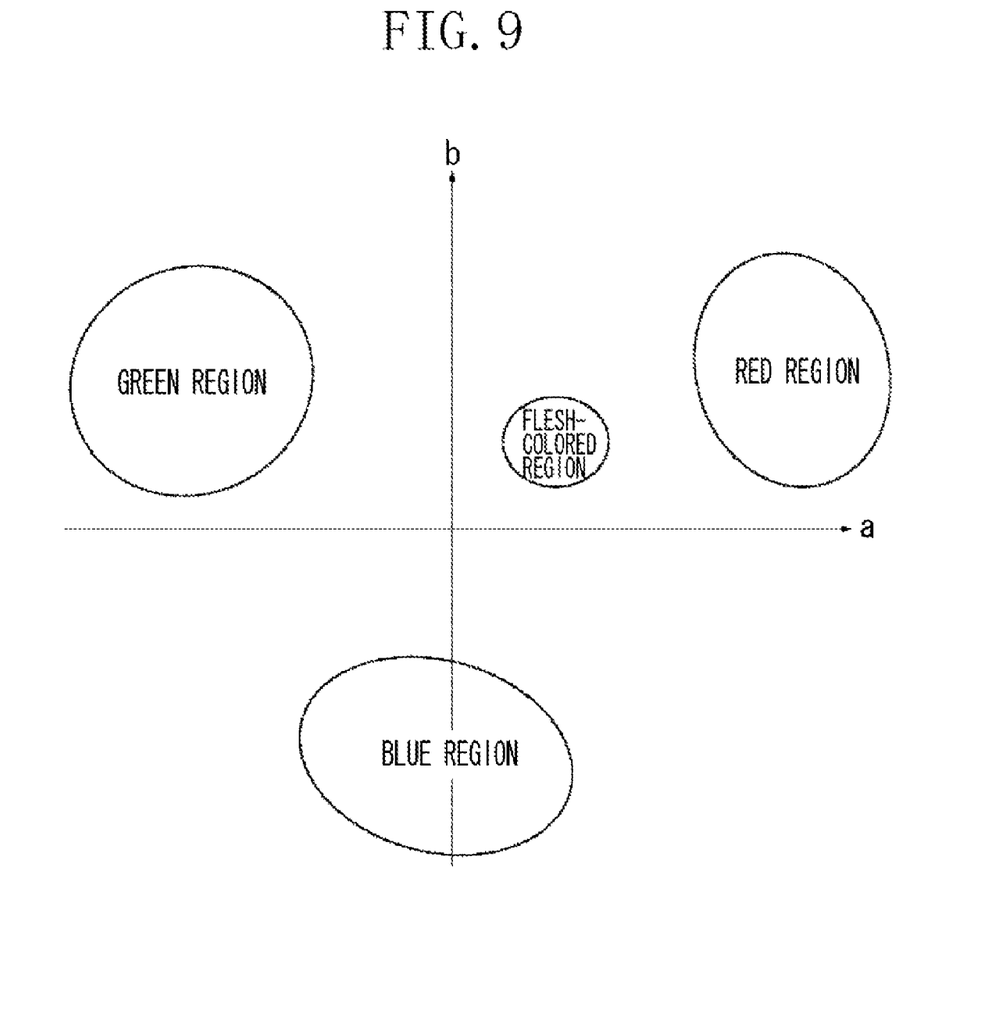
FIG. 9 illustrates example color regions of representative colors of a basic image.

In this manner, an exemplary embodiment can process a wide color region by generating a chart image using red, green, blue, and flesh color, and can prevent an actual correction result from becoming inappropriate even if various images are input. The coordinate plane illustrated in FIG. 9 is an ab-plane of the Jab space (color appearance space).

For example, a basic image of red is an image of a strawberry. A basic image of green is an image of a forest in leaf. A basic image of blue is an image of a blue sky. A basic image of flesh color is an image of human skin. These natural images include colors that can be selected according to the following method. Colors facilitating a relatively large amount of illuminant correction are selected from each of the above-described four color regions, so that a user can easily determine the suitable correction image to be selected. Then, the method includes generating basic images from the selected colors.

The chart image according to an exemplary embodiment includes images obtained by applying six types of illuminant corrections to basic images. Colors of the chart images are determined in the following way. A user can view a target image if an illuminant correction applied to the target image is suitable for a viewing illuminant. In this case, a user cannot view the other five images because the illuminant corrections applied to these images do not suit the viewing illuminant.

Figure 10:
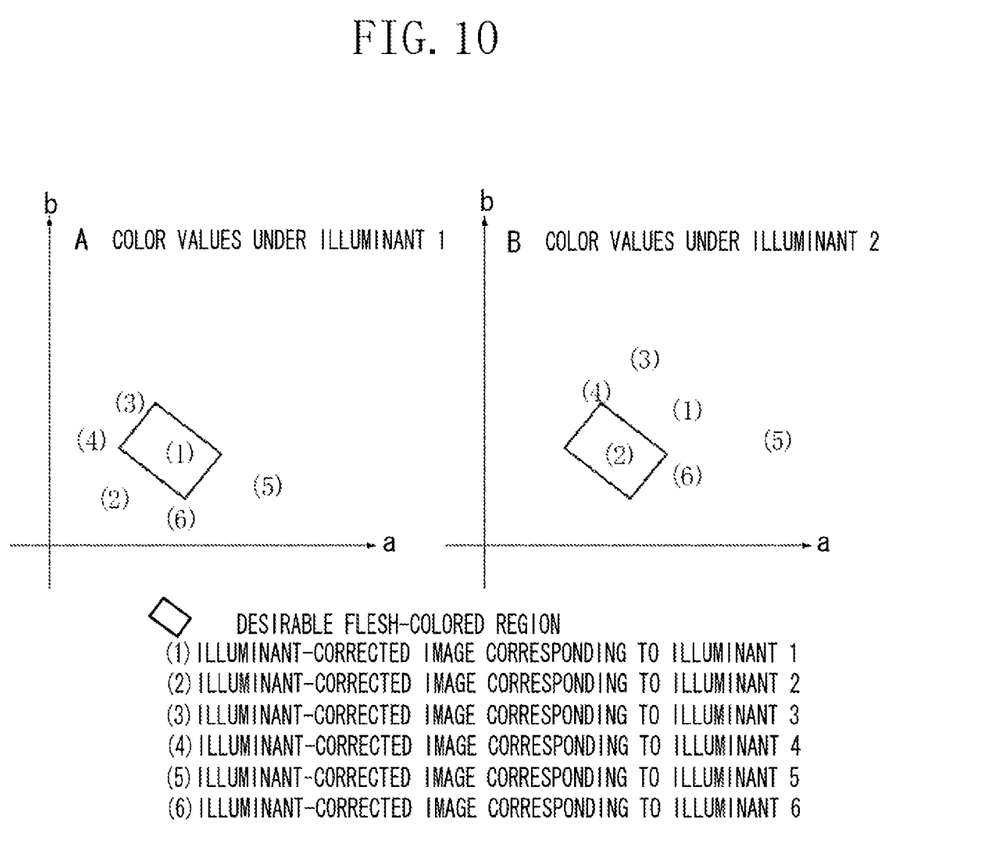
FIG. 10 illustrates an example relationship between a desirable flesh-colored region and each illuminant-corrected image.

FIG. 10 illustrates color values (Jab values) obtained by applying six types of illuminant corrections to a flesh color. A rectangular region illustrated in FIG. 10 indicates a desirable flesh-colored region in the Jab space. An exemplary embodiment determines color values of a flesh color of a basic image in the following manner. If an image is viewed by a user under a viewing illuminant 1, a flesh color subjected to the illuminant correction corresponding to the viewing illuminant 1 can be involved in a desirable flesh-colored region. If an image is viewed by a user under a viewing illuminant 2, a flesh color subjected to the illuminant correction corresponding to the viewing illuminant 2 can be involved in desirable flesh-colored region. If the color values are determined as described above, a user can easily identify an appropriate viewing illuminant. Similarly, an exemplary embodiment determines color values of basic images for other colors (red, green, and blue).

The above-described exemplary embodiment uses a plurality of basic images. Therefore, if a user fails to identify the viewing illuminant according to only one basic image, the user can easily identify the viewing illuminant by referring to other basic images.

Furthermore, to enable a user to easily determine the desirability of a plurality of natural images subjected to illuminant corrections, it is useful to arrange the images in a vertical or horizontal direction according to types of the images. If images of similar types are arrayed in a row, a user can easily compare the images to determine the desirability. Namely, a user can accurately estimate an illuminant correction suitable for a viewing illuminant.

As described above, an exemplary embodiment enables a user to visually determine a desirable illuminant-corrected image without using any instrument for measuring a viewing illuminant. Thus, an exemplary embodiment enables a user to easily identify an illuminant correction suitable for a viewing illuminant. Using the above-described chart image according to an exemplary embodiment enables a user to accurately identify an illuminant correction suitable for a viewing illuminant, without requiring any expert knowledge about colors.

In the above-described exemplary embodiment, the image storage unit 106 stores a chart image beforehand. However, according to an exemplary embodiment, a user can input a chart image via a user interface. An exemplary embodiment includes storing basic images, applying a plurality of illuminant corrections to the stored basic images, and generating a chart image.

The above-described exemplary embodiment applies six types of illuminant corrections to a total of four different color images and arrays the illuminant-corrected images in a pattern such as that illustrated in FIG. 4. However, an exemplary embodiment can use a different layout.

The chart image according to the above-described exemplary embodiment includes four types of color images. However, the chart image can include three types of color images or five or more types of color images.

Figure 5:
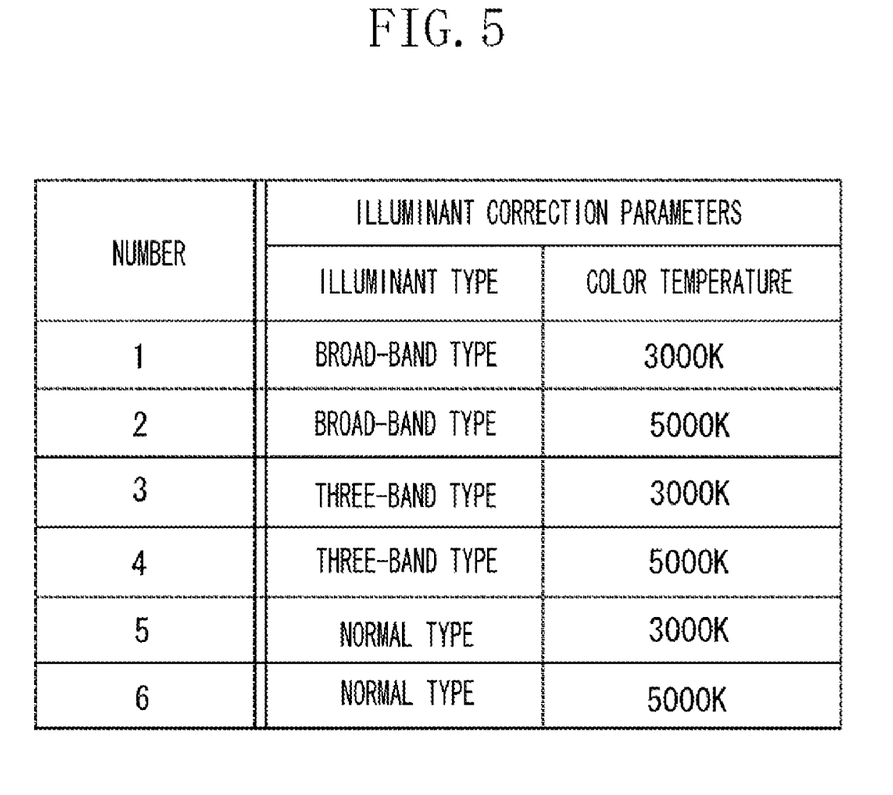
FIG. 5 illustrates an example correspondence table indicating a relationship between a chart number and illuminant correction parameters.

The illuminant corrections performed to generate a chart image according to the above-described exemplary embodiment correspond to six types of viewing illuminants. However, an exemplary embodiment can use illuminant corrections corresponding to four types of viewing illuminants, five types of viewing illuminants, or up to 10 or more types of viewing illuminants. In this case, the numbers in the correspondence table illustrated in FIG. 5 are variable according to the number of types of viewing illuminants.

An input image processed according to the above-described exemplary embodiment is 8-bit data. However, an exemplary embodiment can use an input image of 12-bit data or 16-bit data.

The color space expressing an input image is not limited to the sRGB color space. Therefore, the color space according to the above-described exemplary embodiment can be any other color space (e.g., AdobeRGB space, sYCC space, or a color space dependent on an input device).

The output device color gamut according to the above-described exemplary embodiment is color appearance values "Jab" of 9-sliced RGB data. However, the slice number is not limited to 9. Any other slice number can be used if the color gamut of an output device can be recognized. For example, to reduce the amount of calculations, the slice number can be reduced to 5 or 7. Alternatively, to increase accuracy, the slice number can be increased to 12 or 17.

The color appearance space according to the above-described exemplary embodiment is the CIECAM02 space. However, the color appearance space is not limited to the CIECAM02 space. Therefore, any color appearance space can be used if it is applicable for an illuminant correction. For example, the CIE-standardized color appearance space (e.g., CIELAB or CIECAM97s) is usable.

The color gamut data according to the above-described exemplary embodiment is stored to indicate a relationship between device values "RGB" and illuminant-independent color appearance values "Jab." However, an exemplary embodiment can store color gamut data indicating a relationship between the device values and illuminant-dependent (and also device-independent) color values.

For example, an exemplary embodiment stores a relationship between device values and XYZ values. If illuminant-dependent and device-independent color values are used, the processing includes converting Jab values mapped in step S45 into XYZ values using an inverse conversion model of the color appearance model, and converting the mapped XYZ values into device values using the relationship stored in the color gamut data. The viewing condition parameters used in the inverse conversion model are values complying with the illuminant correction parameters set in step S2.

The present invention can be applied to a system including a plurality of devices (e.g., a host computer, an interface device, a reader, and a printer) or can be applied to a single apparatus (e.g., a copying machine or a facsimile machine).

Furthermore, software program code for realizing the functions of the above-described exemplary embodiments can be supplied to a system or an apparatus including various devices. A computer (or central processing unit (CPU) or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. In this case, the type of program can be any one of object code, interpreter program, and OS script data.

Furthermore, the present invention encompasses supplying program code to a computer with a storage (or recording) medium storing the program code. A storage medium supplying the program can be selected from any one of a floppy disk, a hard disk, an optical disc, a magneto-optical (MO) disc, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

Moreover, an operating system (OS) or other application software running on a computer can execute part or the whole of actual processing based on instructions of the programs. Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-113029 filed Apr. 23, 2007, which is hereby incorporated by reference herein in its entirety.

What is claimed is:

1. A color processing method comprising:
   outputting, via an image output device, a chart image in which a plurality of images obtained by applying illuminant corrections corresponding to a plurality of different illuminants to images corresponding to a plurality of representative colors are arranged in a predetermined layout;
   receiving a user's instruction to select one of the illuminant corrections corresponding to one of the plurality of different illuminants based on the output chart image; and
   setting the selected illuminant correction to be applied to an original image,
   wherein the plurality of representative colors are memory colors.

2. The color processing method according to claim 1, wherein the plurality of representative colors includes or consists of: red, green, blue, and flesh color.

3. The color processing method according to claim 1, wherein the plurality of different viewing illuminants are different in respect of a combination of spectral distribution and color temperature of each viewing illuminant.

4. The color processing method according to claim 3, wherein the type of spectral distribution of each viewing illuminant includes one of a broad-band type, a three-band type, and a normal type.

5. The color processing method according to claim 1, wherein the predetermined layout includes providing side by side in a row a plurality of images obtained by applying the illuminant corrections corresponding to the plurality of different illuminants to images of a same type.

6. The color processing method according to claim 1, wherein the plurality of images arranged in the chart image include a natural image familiar to the user.

7. The color processing method according to claim 1, further comprising:
   inputting an original image;
   applying the set illuminant correction to the original image; and
   outputting, via the image output device, an image obtained by applying the set illuminant correction to the original image.

8. A computer-readable storage medium storing instructions which, when executed by an apparatus, cause the apparatus to perform the color processing method according to claim 1.

9. A color processing apparatus comprising:
   an output unit configured to output a chart image in which a plurality of images obtained by applying illuminant corrections corresponding to a plurality of different illuminants to images corresponding to a plurality of representative colors are arranged in a predetermined layout;
   an input unit configured to receive a user's instruction to select one of the illuminant corrections corresponding to the plurality of different illuminants based on the user's evaluation of the output chart image; and
   a setting unit configured to set the selected illuminant correction to be applied to an original image,
   wherein the plurality of representative colors are memory colors.

* * * * *